(No Model.)
S. FOGLESON & J. B. MOUSER.
TWINE CUTTER.
No. 347,234. Patented Aug. 10, 1886.
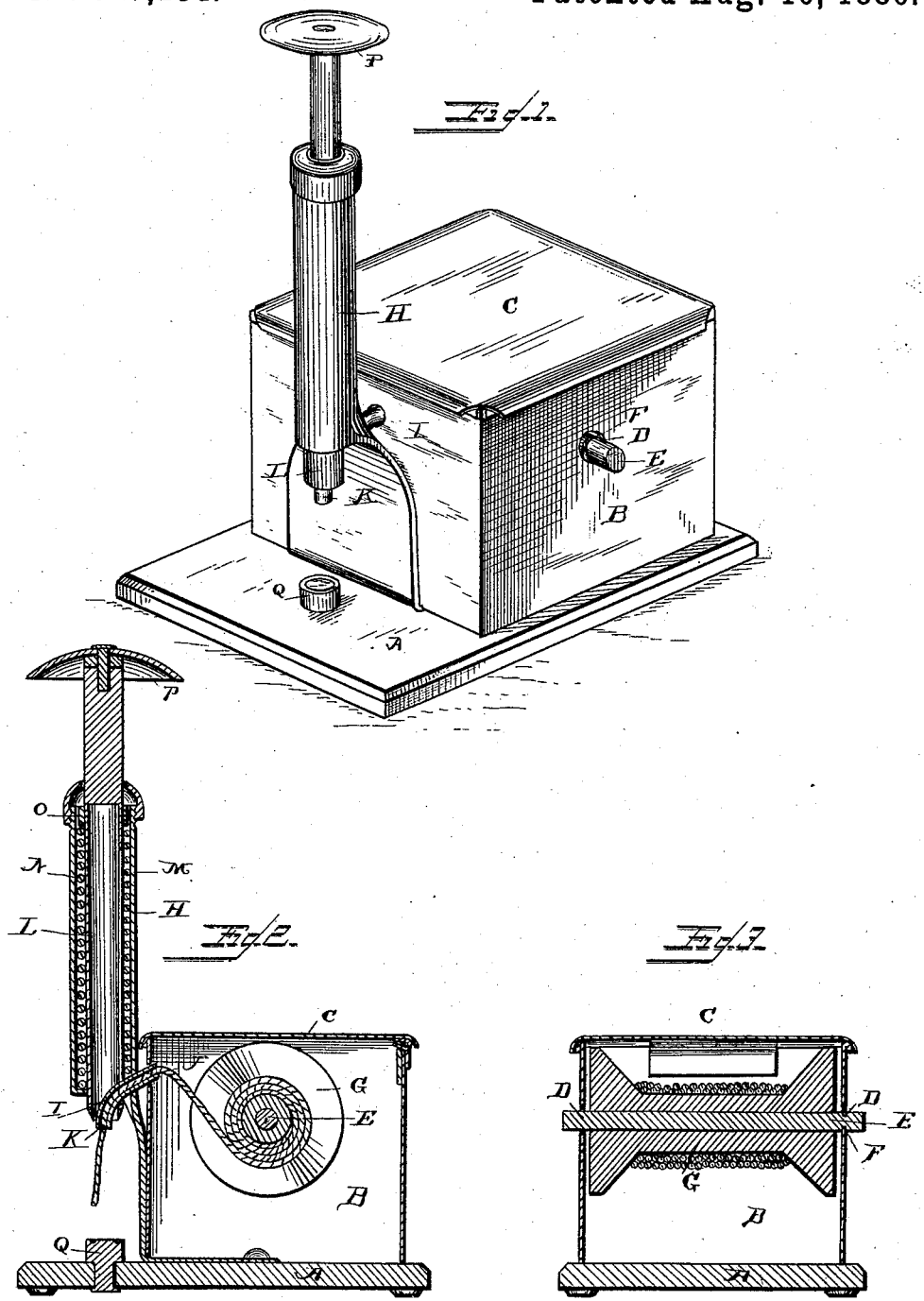

UNITED STATES PATENT OFFICE.

SCHILLER FOGLESON AND JOHN B. MOUSER, OF MARION, OHIO.

TWINE-CUTTER.

SPECIFICATION forming part of Letters Patent No. 347,234, dated August 10, 1886.

Application filed June 22, 1886. Serial No. 205,947. (No model.)

*To all whom it may concern:*

Be it known that we, SCHILLER FOGLESON and JOHN B. MOUSER, citizens of the United States, and residents of Marion, in the county of Marion and State of Ohio, have invented certain new and useful Improvements in Thread or Twine Cutters; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved thread or twine cutter. Fig. 2 is a vertical sectional view of the same; and Fig. 3 is a vertical sectional view on line $x\ x$, Fig. 2, showing the spool and the pin for the spool.

Similar letters of reference indicate corresponding parts in all the figures.

Our invention has relation to cutters for thread or twine; and it consists in the improved construction and combination of parts of such a cutter having a receptacle for a ball or spool of thread or twine, and having a tubular cutter, through which the thread or twine passes, as hereinafter more fully described and claimed.

In the accompanying drawings, the letter A indicates a base-plate, upon which is secured a box, B, having a hinged lid, C, and having two registering perforations, D, in the opposite sides, through which perforations a pin, E, passes, which pin is formed with annular grooves near its ends, as shown at F, with which grooves it rests and turns in the perforations, the spool G being placed upon the pin.

A vertical tubular cutter-guide, H, is secured at its lower end to the forward side of the box, and a twine-guide, I, having a horizontal portion, J, passing into the box, and a vertical portion, K, passing down into the cutter-guide, is secured to the box and to the guide.

A tubular cutter, L, slides within the tubular guide, having a longitudinal slot, M, in one side, with which slot it slides upon the twine-guide, and a coiled spring, N, is placed within the tubular guide, and bears with its lower end against the twine-guide, and with its upper end against the solid upper end, O, of the tubular cutter. The upper end of the cutter is provided with a button or knob, P', and an anvil, Q, of copper or soft metal, is secured to the base directly under the cutter.

When a spool of thread or twine is placed within the box, the thread or twine is carried through the thread or twine guide, the end projecting below the end of the guide. When, now, a sufficient length of twine or thread has been drawn out, the cutter may be depressed with a light blow, cutting the thread or twine, and cutting it at a point sufficiently far below the end of the guide to allow a portion of the thread or twine to hang out through the guide.

The pin, having the annular grooves around the ends, resting in the perforations in the sides of the box, will hold the spool upon it, and the grooves will prevent the pin from slipping in the perforations, so that the pin may be easily removed from the spool and box and be placed in another spool and secured in the box, while the grooves will retain the pin in place.

Having thus described our invention, we claim and desire to secure by Letters Patent of the United States—

1. In a thread or twine cutter, the combination of a thread or twine receptacle, a tubular guide secured to the receptacle, a bent thread or twine guide having one end secured in the receptacle, and having one end projecting below the lower end of the tubular guide and passing through a slot in the tubular cutter, which cutter slides in said guide, and is provided with a sharpened lower end and with a button or knob at its upper end, a spring within the tubular cutter bearing against the closed upper portion of the tubular cutter and against the guide, and an anvil of soft metal secured below the lower end of the cutter, as and for the purpose shown and set forth.

2. In a thread or twine cutter, the combination of a box having a hinged lid, and having two registering perforations in the opposite sides, with a pin or bolt having annular grooves near its ends, and turning with the grooves in the perforations in the sides of the box, as and for the purpose shown and set forth.

In testimony that we claim the foregoing as our own we have hereunto affixed our signatures in presence of two witnesses.

SCHILLER FOGLESON.
JOHN B. MOUSER.

Witnesses:
W. B. CAMP,
J. N. ALSTON.